3,270,085
METHOD FOR ISOMERIZING ALPHA OLEFINS TO BETA OLEFINS WITH CHROMIUM NICKEL PHOSPHATE
Charles R. Noddings, Midland, and Ronald G. Gates, Breckenridge, Mich., assignors to The Dow Chemical Company, Midland, Mich., a corporation of Delaware
Filed Jan. 6, 1964, Ser. No. 335,830
2 Claims. (Cl. 260—683.2)

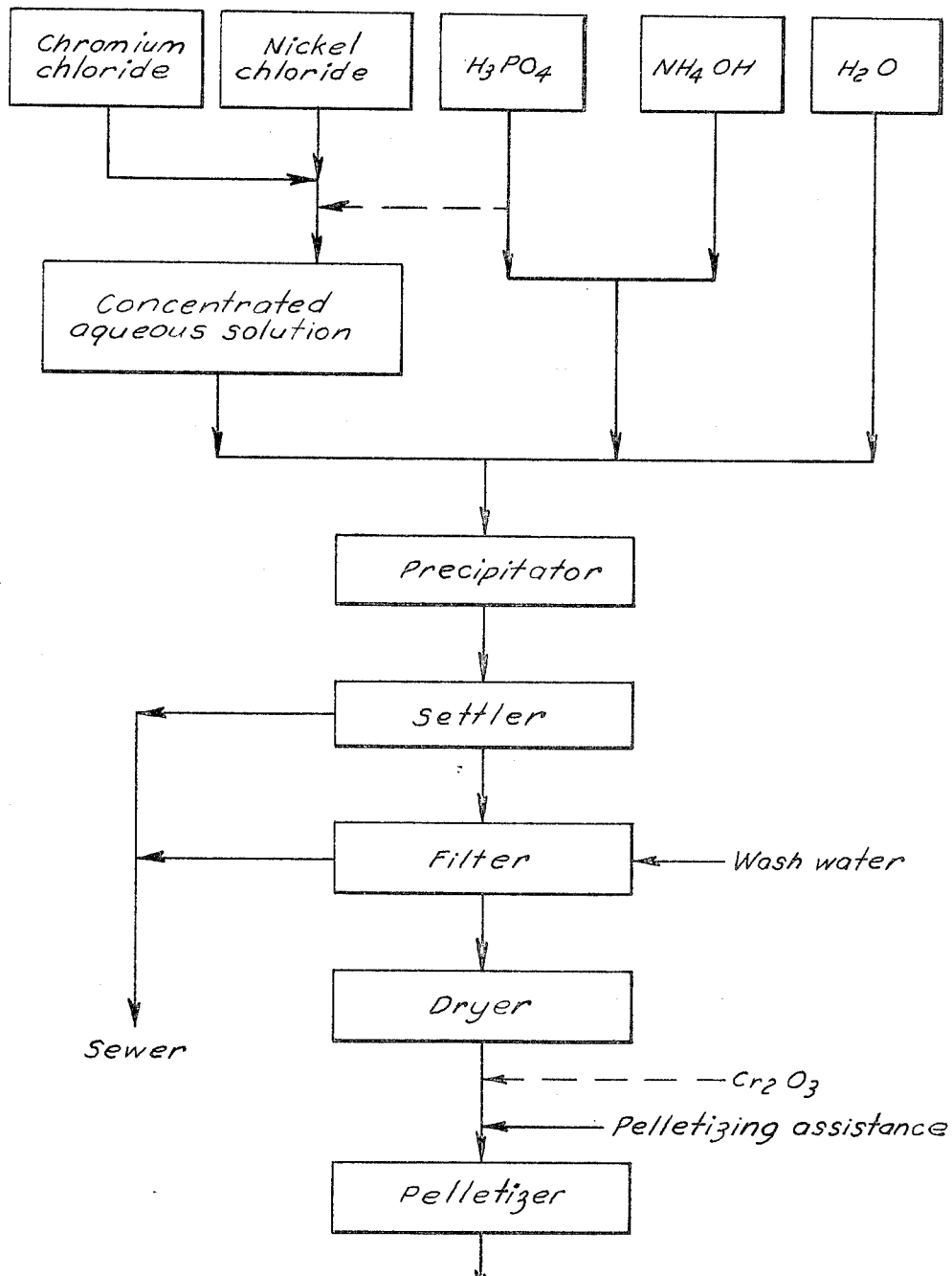

This invention concerns a new catalyst and a process employing the catalyst for the isomerization of alpha olefins having four or more carbon atoms in the molecule to beta olefins.

It is, of course, well known that aliphatic hydrocarbons, e.g., petroleum fractions (mixed hydrocarbons) or individual paraffins or olefins, can be pyrolyzed to obtain a mixture of products comprising a small, though appreciable, proportion of conjugated diolefins and a larger proportion of shorter chain length unsaturate products. However, it is unusual to find among those materials capable of complex compound formation and which in such form are dehydrogenation and/or cracking catalysts one group of complexes which are also capable of isomerizing alpha olefins to beta olefins in near quantitative yields.

It is an object of this invention to provide an improved method for the isomerization of alpha $C_4$ and higher olefinic hydrocarbons to their beta isomers. Another object of the present invention is to provide such a method whereby useful organic products (that is products other than $CO_2$, carbon and hydrogen from the isomerization) are obtained in quantities which increase the economical value of the products over that of the starting carbon compounds. A further object is to provide a set of operating conditions under which the new catalyst may effectively be used for the foregoing purposes. Other objects will be apparent from the following description of the invention.

We have found that a chromium-nickel phosphate prepared in the manner of our copending application filed even date herewith, entitled Chromium Nickel Phosphate Catalyst and Method for Dehydrogenating and Cracking Alkanes and Olefins, is effective for the isomerization of 1–$C_4$ and higher alkenes to their beta isomer when the hydrocarbon is contacted with the catalyst at from 100° to about 300° C.

The catalyst is prepared by mixing together water-soluble metal salts of chromium and nickel with a water-soluble form of the ortho-phosphate moiety ($PO_4^\equiv$) in an aqueous medium under conditions such that the pH is within the range of from 4 to 10. By this reference applicants incorporate the description and examples of said copending application relative to catalyst production.

$C_4$ and higher hydrocarbons can be isomerized in the presence of the catalyst of the present invention at temperatures between 100° and 300° C., and in some instances at temperatures as much as 50° C. above this range. The reaction is advantageously carried out at temperatures between 200° and 280° C.

Except for the foregoing limitations, the conditions under which the isomerization reaction is carried out may be varied widely. Also, the method is operable at atmospheric, subatmospheric, or at superatmospheric pressures, provided the hydrocarbon reactant is in vapoized form. In some instances, the yield of isomerized product decreases upon increase of the reaction pressure above atmospheric. However, the ability to operate at an increased pressure is of considerable advantage, since condensation of the reaction products may thereby be facilitated. In general, the proportion of hydrocarbon reacted and also the amount of by-product formation per pass through the catalyst bed tend to decrease with increase in the rate of vapor flow, and vice versa.

In producing isomerized hydrocarbon products in accordance with the invention, a reaction chamber is charged with the granular catalyst and the lubricant employed is removed from the catalyst. This is usually accomplished by passing an $O_2$-containing gas such as oxygen or air, preferably a mixture of about equal volumes of air and steam, through the catalyst bed at a high temperature, e.g., 450° to 750° C. When the lubricant used in preparing the catalyst granules is a substance capable of being vaporized, e.g., a mineral or vegetable oil, the step of treating the catalyst with air may be preceded by one of passing an inert gas or vapor such as steam, nitrogen, or carbon dioxide over the catalyst so as to vaporize at least a portion of the binding agent from the catalyst granules.

After freeing the catalyst of the lubricant, the catalyst bed is swept free of the $O_2$ or air with steam and is heated to the desired reaction temperature, preferably by passing superheated steam through the same. The hydrocarbon reactant, e.g., butylene, amylene, hexylene, or heptylene, having at least 4 carbon atoms is then passed through the catalyst bed at a temperature between 100° and 300° C., and preferably between 200° and 280° C. The usual procedure is to pass the hydrocarbon gas which has been superheated to 100° C. or above, i.e., to the desired reaction temperature through the bed of catalyst. However, the heat may be supplied on other ways, e.g., by externally heating the catalyst chamber itself. As hereinbefore mentioned, the rate of vapor flow through the catalyst chamber may be varied widely, but in practice the flow usually corresponds to between 100 and 700 liters of the hydrocarbon (expressed as at 0° C. and 760 millimeters pressure) per liter of catalyst bed per hour.

The vapors issuing from the catalyst chamber are ordinarily passed through heat exchangers and other cooling devices to condense the hydrocarbon products.

During use in the process, the catalyst gradually accumulates a small amount of carbon, or non-volatile organic material, and loses its activity. Accordingly, flow of the hydrocarbon starting material is periodically interrupted and air, admixed with the steam, is blown through the catalyst bed, e.g., at temperatures between 450° and 700° C., to oxidize and removed the carbonaceous or organic material and thus reactivate the catalyst. Usually several hours are required to carry out this reactivation step. However, if, during compounding of the catalyst into tablet form, an agent having the property of catalyzing the oxidation of carbon is admixed therewith, the time subsequently required for reactivating the catalyst with steam and air may be reduced markedly. For instance, the incorporation of one or two percent by weight of chromic oxide in the catalyst tablets facilitates reactivation of the catalyst. Other agents having the property of catalyzing the burning of carbon are known to the art.

After completing the reactivation step, the catalyst chamber is again swept free of air with steam and the introduction of hydrocarbons is resumed. Usually, reactivation of a catalyst is advisable after several hours of use in the isomerization reaction. In practice, two or more catalyst chambers are preferably employed in a system provided with connections for passing the reaction mixture alternately through different catalyst beds. One catalyst bed is usually employed in the isomerization reaction while another is being heated, reactivated and cooled in consecutive operations. By operating in this manner, the isomerization reaction may be carried out continuously.

The following example illustrates the present invention, but is not to be construed as limiting:

*Example 1.*—In the manner shown in the following diagram, 14.3 gram moles of chromium chloride as an 11.5 weight percent aqueous solution thereof was mixed in a vessel with 2.38 gram moles of nickel chloride as a 29 weight percent aqueous solution and 16.3 gram moles of phosphoric acid as a 71 weight percent aqueous solution and the resulting mixture is diluted with water to a total volume of 80 gallons. Upon completion of the addition of the above enumerated chemicals to the vessel reactor, an aqueous 14.7 weight percent ammonium hydroxide solution was, or had been, added. In some instances, the aqueous ammonium hydroxide was added together with the reactants, in others after addition of all of the reactants, and in still others the phosphoric acid and ammonia were first mixed and then admixed with the other reactants. The reaction mass was continuously stirred and base or acid added to produce and maintain a pH of the system between 4.5 and 7.1. In the specific instance 49.1 gram moles of ammonium hydroxide were required to maintain the pH at 4.5 at the end of 2.5 hours of reaction. The reaction was considered complete when the final pH remained constant. Thereafter the reaction mass was allowed to settle overnight after which the supernatant liquid above the precipitate was drawn off (approximately 58 gallons decanted) and the resulting thick slurry filtered and washed with water. The filtrate was discarded. In the specific instance the slurry was washed by decantation with water 14 times until chloride free, then removed and dried at 100° C. in a rotary drier. The dry powder was recovered to the extent of 78% of the theoretical yield, based on the starting materials used, and was crushed, mixed with about 2% of a lubricant grade graphite and expressed into pellets about ¼ inch in diameter and ¼ inch long. The graphite was burned off by treating the pellets with air and steam at about 650° C. for about 6 hours. The resulting catalyst pellets were tested as an isomerization catalyst as outlined in the following table.

Table

| | | | |
|---|---|---|---|
| Catalyst Preparation Data: | | | |
| Mole ratio Cr/Ni | 6.0 | 9.0 | 6.0 |
| pH of precipitation | 4.5 | 4.5 | 6.0 |
| Alkene Isomerization: | | | |
| Feedstock, 93% butene-1 v./v. hr., S.T.P | 286 | 344 | 320 |
| Temperature, ° C | 260 | 216 | 200 |
| Product Data: | | | |
| Percent conversion per pass | 74 | 77 | 64 |
| Percent yield of 2-butene based on 1-butene converted | 100 | 100 | 100 |

We claim:

1. The method which comprises isomerizing alpha olefinic hydrocarbons having at least 4 carbon atoms to their corresponding beta isomers which comprises passing the hydrocarbon at a temperature between 100° and 300° C. in contact with a catalyst composed of a metal phosphate material consisting essentially of phosphate radicals chemically combined with chromium and nickel in the relative proportions of between 6 and 12 atoms of chromium per atom of nickel which metal phosphate material is preparable by mixing a solution of soluble salts of chromium and nickel with a solution of a soluble orthophosphate and precipitating said metal phosphate material from the mixture at a pH of between about 4 to 10.

2. The method of claim 1 which comprises passing hydrocarbon vapors containing butene-1 into contact with said catalyst.

References Cited by the Examiner
UNITED STATES PATENTS

| | | | |
|---|---|---|---|
| 2,281,804 | 5/1942 | Ruthruff | 260—683.2 |
| 2,336,600 | 12/1943 | Fawcett | 260—683.2 |
| 2,442,320 | 5/1948 | Britton et al. | 260—681 |

DELBERT E. GANTZ, *Primary Examiner.*

R. H. SHUBERT, *Assistant Examiner.*